Figure 3:
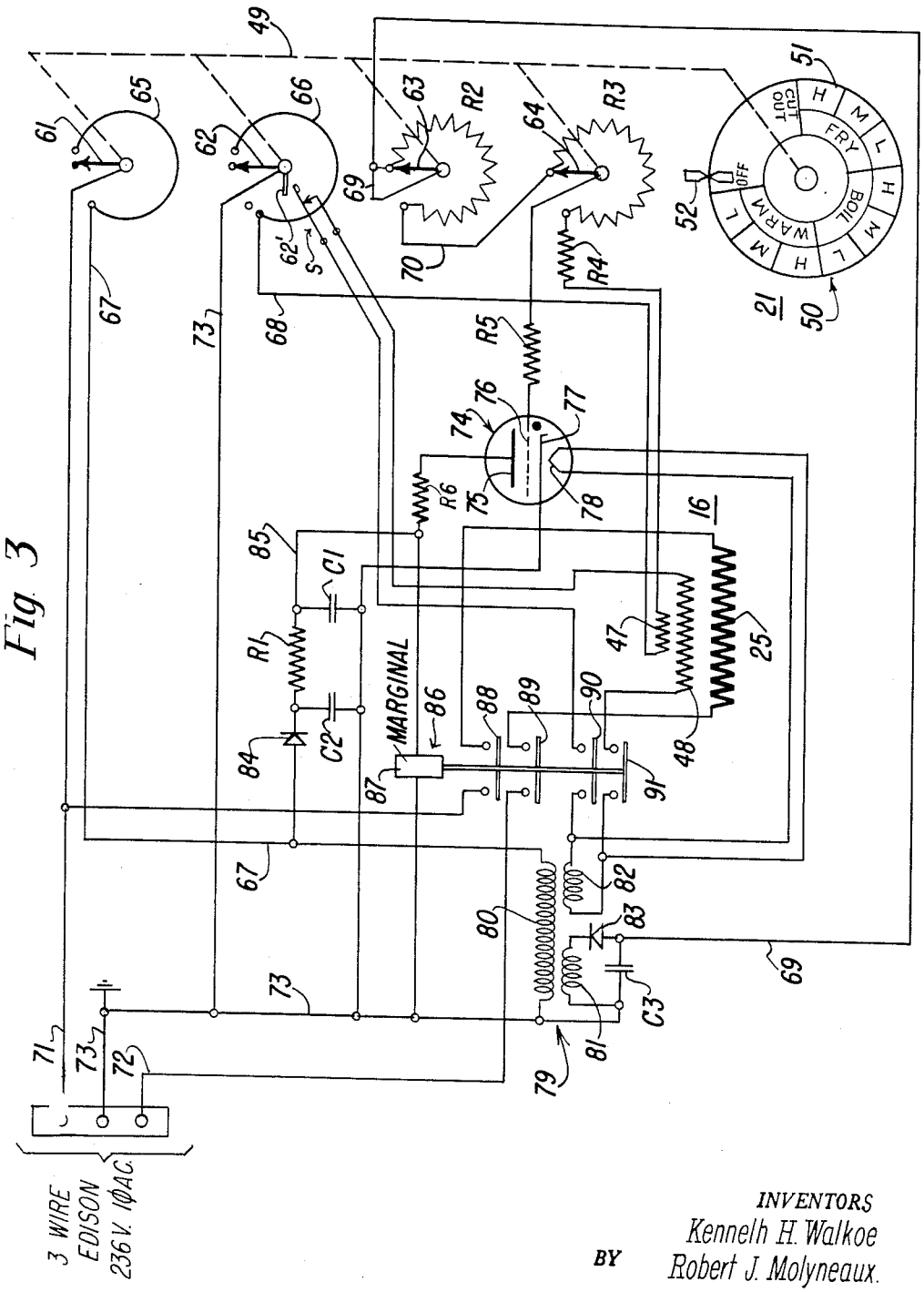

Dec. 20, 1955  R. J. MOLYNEAUX ET AL  2,727,975
ELECTRIC HEATING APPARATUS
Filed Dec. 14, 1953  2 Sheets-Sheet 1
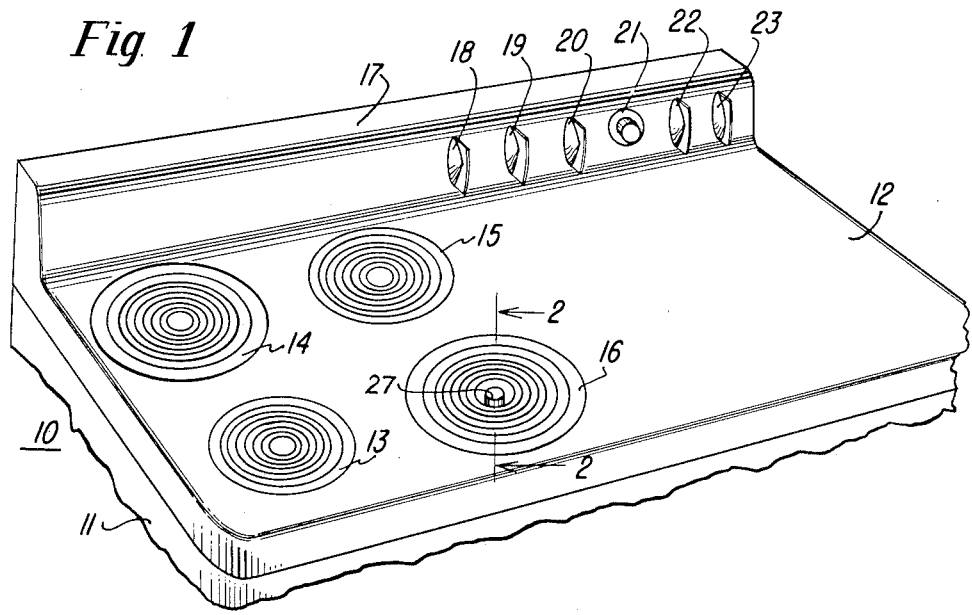
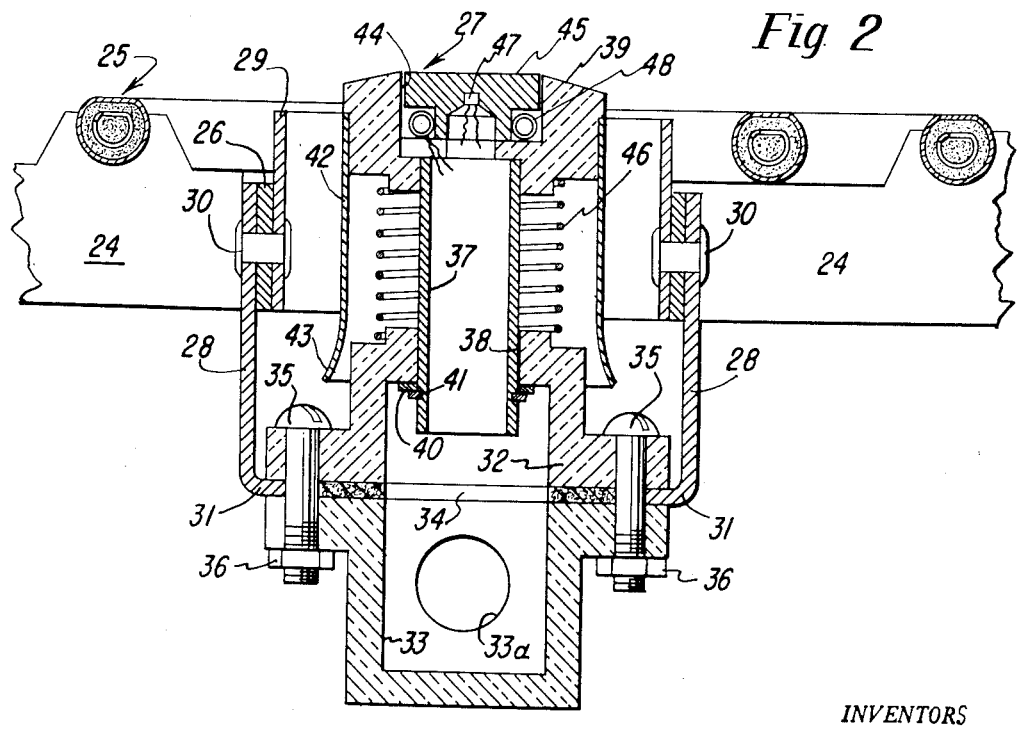
INVENTORS
Kenneth H. Walkoe
Robert J. Molyneaux
BY
Smith Olsen Baird & Gulbrandsen
Attys.

Dec. 20, 1955

R. J. MOLYNEAUX ET AL 2,727,975

ELECTRIC HEATING APPARATUS

Filed Dec. 14, 1953

2 Sheets-Sheet 2

INVENTORS
Kenneth H. Walkoe
Robert J. Molyneaux.
BY
Smith, Olsen Burd & Gulbrandsen Attys.

United States Patent Office 2,727,975
Patented Dec. 20, 1955

2,727,975
ELECTRIC HEATING APPARATUS

Robert J. Molyneaux, Chicago, and Kenneth H. Walkoe, Lombard, Ill., assignors to General Electric Company, a corporation of New York Application December 14, 1953, Serial No. 397,874

10 Claims. (Cl. 219—20)

The present invention relates to electric heating apparatus, and more particularly to improved automatic temperature control systems for cooking vesels heated by electric heating units or hotplates and of the character disclosed in the copending application of Robert J. Molyneaux and Kenneth H. Walkoe, Serial No. 375,753, filed August 21, 1953.

It is the general object of the present invention to provide an automatic temperature control system for cooking vessels heated by an electric hotplate that comprises a circuit network of simple and economical connection and arrangement involving a minimum number of conventional elements.

Another object of the invention is to provide an automatic temperature control system of the character noted, that includes a power switch for selectively controlling the heating of the hotplate, an oscillator for selectively controlling the operation of the power switch, and a temperature sensing element responsive to the temperature of the cooking vessel for selectively controlling the operation of the oscillator.

A further object of the invention is to provide in an automatic temperature control system of the character described, an oscillator of the relaxation type governed by a gaseous discharge tube of the thyratron type, whereby the oscillator is of simple and economical connection and arrangement.

Further features of the invention pertain to the particular arrangement of the elements of the electric heating apparatus and of the associated control network, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a fragmentary front perspective view of the upper portion of an electric range incorporating electric heating apparatus embodying the present invention;

Fig. 2 is a greatly enlarged fragmentary vertical sectional view of one of the electric heating units or hotplates incorporated in the electric range, taken in the direction of the arrows along the line 2—2 in Fig. 1, illustrating the construction of the temperature sensing unit incorporated therein and forming a part of the electric control circuit; and Fig. 3 is a diagram of the electric control circuit for the electric heating unit or hotplate and incorporating the temperature sensing unit, both shown in Fig. 2.

Referring now to Fig. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced-apart relation in a substantially rectangular pattern on the left-hand side thereof. The body 11 houses an oven, not shown, in the right-hand portion thereof, and a compartment, not shown, in the left-hand portion thereof, the oven and the compartment being respectively provided with front doors, not shown. The cooking top 12 carries an upstanding backsplash 17 adjacent to the rear thereof, that, in turn, carries a plurality of surface heating unit selector switches 18, 19 and 20, a special control switch 21, an oven selector switch 22, and an oven regulator or thermostatic switch 23, the elements 18 to 23, inclusive, being arranged in a row on the right-hand side of the backsplash 17. The selector switches 18, 19 and 20 respectively correspond to the surface heating units 13, 14 and 15 of conventional construction and are respectively included in the electric heating circuits thereof; while the special control switch 21 corresponds to the surface heating unit 16 of special construction and is included in the electric heating circuit thereof. Each of the surface heating unit selector switches 18, 19 and 20 and the oven selector switch 22, as well as the thermostatic switch 23, are of conventional construction and arrangement.

The cooking top 12 has a plurality of openings therein that respectively receive the surface heating units 13, etc.; and each of the surface heating units 13, 14 and 15 may be fundamentally of the construction disclosed in U. S. Patent No. 2,565,443, granted on August 21, 1951, to Oliver G. Vogel and Francis E. Kirk; while the surface heating unit 16 is of the special construction disclosed in the previously-mentioned Molyneaux and Walkoe application.

The surface heating unit 16 is of the hotplate type and is mounted for pivotal movements in the associated opening provided in the cooking top 12, by mechanism, not shown, that is preferably of the construction of that disclosed in U. S. Patent No. 2,565,432, granted on August 21, 1951, to Francis E. Kirk. More particularly, referring to Fig. 2, the heating unit 16 comprises a spider 24 carrying a heating element 25. The heating element 25 is in the form of a continuous helical coil or spiral, the turns of which are arranged in radially spaced-apart relation; and preferably the heating element 25 is of the metal sheath-helical resistance conductor type disclosed in U. S. Patent No. 1,367,341, granted on February 1, 1921, to Charles C. Abbott. The spider 24 comprises a substantially centrally disposed upstanding ring 26, the coils of the heating element 25 being selectively staked to the arms of the spider 24 in the general manner disclosed in the Vogel and Kirk patent mentioned. The top surfaces of the coils of the heating element 25 are flattened to define a substantially horizontal plane adapted to engage and to support the bottom wall of a cooking vessel, or the like, not shown.

The hotplate 16 carries a temperature sensing unit 27 within the central ring 26 that is adapted to engage the bottom wall of the cooking vessel, or the like, supported upon the heating element 25; and more particularly, a pair of opposed depending arms 28 are arranged exteriorly of the central ring 26, and an upstanding tubular heat shield 29 is arranged interiorly of the central ring 26, the arms 28 and the heat shield 29 being retained in place by an opposed pair of rivets 30. The arms 28 terminate in inwardly directed flanges 31 disposed below the central ring 26 that carry upper and lower substantially cup-shaped insulating housings 32 and 33 formed of lava, or the like. The upper housing 32 is arranged in inverted position and constitutes a supporting base, the housings 32 and 33 being retained in place upon the flanges 31, with an asbestos ring 34 clamped therebetween, by removable screws 35, provided with cooperating nuts 36. An upstanding tubular member 37 is slidably mounted in a cooperating opening 38 provided in the top of the base 32, the upper end of the tubular member 37 carrying an insulating ring 39 formed of lava, or the like, and arranged within the heat baffle 29 in spaced relation with respect thereto. The tubular member 37 is retained in place by an arrangement including a surrounding washer 40 and a cooperating lock ring 41 carried on the lower end thereof and cooperating with the top of the base 32 adjacent to the opening 38. The ring 39, in turn, carries a depending tubular heat shield 42 of general skirt-like structure that is spaced inwardly with respect to the cooperating heat shield 29, the extreme lower end of the heat shield 42 being outwardly flared, as indicated at 43, so that it covers the top of the base 32. A central cavity 44 is formed in the top of the ring 39 and carries a sensing button 45 formed of aluminum, or the like.

In the arrangement, the heat shields 29 and 42, as well as the tubular member 37, are preferably formed of stainless steel, or other bright and reflective material; while the sensing button 45 is formed of aluminum, or the like, as previously noted, so that it constitutes a good heat conductor capable of following closely the temperature of the bottom wall of a cooking vessel, or the like, supported by the heating element 25. The tubular member 37, the ring 39, the heat shield 42 and the sensing button 45 are movable as a unit with respect to the base 32, by virtue of the arrangement of a coil spring 46 surrounding the tubular member 37 and disposed between the top of the base 32 and the bottom of the ring 39. More particularly, the coil spring 46 normally biases the parts 37, 39, 42 and 45 upwardly with respect to the base 32; whereby the top surface of the sensing button 45 is normally disposed slightly above the substantially horizontal plane of the flattened top surface of the heating elements 25. However, when a cooking vessel, or the like, is placed upon the heating element 25, the bottom wall thereof engages the top surface of the sensing button 45 moving the elements 37, 39, 42 and 45 downwardly with respect to the base 32 against the bias of the coil spring 36; whereby the top surface of the sensing button 45 is urged in good thermal contact with the bottom wall of the supported cooking vessel by the coil spring 46.

A temperature sensing resistor 47 is arranged in a cooperating centrally disposed cavity formed in the lower surface of the sensing button 45; and a surrounding biasing resistor 48 is arranged in an annular cavity provided in the bottom of the sensing button 45 in surrounding relation with respect to the temperature sensing resistor 47. The temperature sensing resistor 47 and the biasing resistor 48 are movable with the sensing button 45 and are arranged in good heat exchange relation therewith, for a purpose more fully explained hereinafter. Also, the temperature sensing resistor 47 and the biasing resistor 48 are included in external electric circuits, described more fully hereinafter, the connecting wiring elements extending through the tubular member 37 and through a hole 33a provided in the housing 33. Since the wiring mentioned is subject to a rather high temperature, it is preferably formed of silver, or the like, and is preferably covered with an insulating material capable of withstanding the relatively high temperature mentioned, such, for example as polytetrafluoroethylene, sold as "Teflon." The biasing resistor 48 may be formed of any suitable resistance material, such, for example, as a nickel-chrome alloy; while the sensing resistor 47 is formed of a material having a high negative temperature coefficient of resistance, such, for example, as the ceramic-like material consisting of sintered aluminum oxide, and an oxide of magnesium, manganese, titanium, iron, nickel, cobalt, zinc, etc., and known as "thermistor" material. For example, the thermistor 47 may have the exceedingly high temperature coefficient of resistance corresponding to a resistance rate change of —0.044 ohm/ohm/°C.; whereby the characteristic of the thermistor may be as follows:

| Temperature (°C.): | Total resistance (ohms) |
|---|---|
| 25 | 100,000 |
| 50 | 34,000 |
| 100 | 6,000 |
| 150 | 1,700 |
| 200 | 580 |

Referring now to Fig. 3, the manually operable control switch 21 carried by the backsplash 17 and individually associated with the hotplate 16 comprises a rotatably mounted operating shaft 49 carrying a manual dial or knob 50 on the outer end thereof and provided with indicia 51 cooperating with an index marker 52 carried by the backsplash 17. More particularly, the control switch 21 comprises off, warm, boil, fry and cut-out positions that correspond to respective portions of the indicia 51 carried by the manual dial 50 and cooperating with the index marker 52, each of the warm, boil and fry ranges includes low, medium and high subsections. In the arrangement, the indicia 51 carried by the manual dial 50 correspond to temperatures of a cooking vessel supported by the hotplate 16; whereby the warm range may correspond to the temperature range 120°–220° F., the boil range may correspond to the temperature range 220°–320° F.; and the fry range may correspond to the temperature range 320–420° F. Accordingly, the warm, boil and fry ranges respectively correspond to meat-cooking, candy-making and deep-fat-frying cooking operations.

Further, the rotatable shaft 49 of the control switch 21 carries four wipers 61, 62, 63 and 64 that are simultaneously adjusted as the manual knob 50 is rotated. The wipers 61 and 62 respectively comprise portions of two switches respectively including cooperating conducting segments 65 and 66; the wiper 63 comprises a portion of a rheostat including a cooperating resistor R2; and the wiper 64 comprises a portion of a potentiometer including a cooperating resistor R3. The conducting segments 65 and 66 respectively terminate two conductors 67 and 68; the wiper 63 and one end of the resistor R2 commonly terminate a conductor 69; the other end of the resistor R2 is connected by a conductor 70 to one end of the resistor R3; the other end of the resistor R3 is connected to one end of a fixed resistor R4; the other end of the resistor R4 is connected to one terminal of the thermistor 47; and the other terminal of the thermistor 47 is connected to the conductor 68; also the circuit network comprises a three-wire Edison source of power supply of 236 volts, single phase A. C., including two outside lines 71 and 72 and a grounded neutral line 73, the outside line 71 and the neutral line 73 being respectively connected to the wipers 61 and 62. Also, the wiper 64 is connected to one end of a resistor R5. Finally the rotatable shaft 49 of the control switch 21 carries an insulator 62', disposed adjacent to the inner end of the wiper 62, and cooperating with a set of switch springs S, normally occupying its closed position.

In the arrangement, when the manual dial 50 occupies its off position, the wipers 61 and 62 respectively disengage the cooperating conducting segments 65 and 66; the wiper 63 engages the one end of the resistor R2 terminating the conductor 69; and the wiper 64 engages the one end of the resistor R3 terminating the conductor 70. When the manual dial 50 is rotated in the clockwise direction out of its off position about 10° into the lower subsection of its warm range, the wipers 61 and 62 respectively engage the conducting segments 65 and 66; the wiper 63 shorts-out a small portion of the associated resistor R2 that is included between the conductors 69 and 70; and the wiper 64 inserts a small portion of the associated resistor R3 between the conductor 70 and the resistor R5. As the manual dial 50 is rotated through its warm range and its boil range and its fry range, the wipers 61 and 62 remain in engagement with respective conducting segments 65 and 66; the wiper 63 progressively short-circuits additional portions of the associated resistor R2; and the wiper 64 progressively inserts additional portions of the associated resistor R3 in series relation between the conductor 70 and the resistor R5. When the manual dial 50 is rotated further in the clockwise direction into its cut-out position, the wiper 61 remains in engagement with the associated conducting segment 65; the wiper 62 disengages the associated conducting segment 66 disconnecting the neutral line 73 from the conductor 68; the wiper 63 short-circuits completely the associated resistor R2; and the wiper 64 inserts completely the associated resistor R3 in series relation between the conductor 70 and the resistor R5. Further, when the manual dial 50 is rotated into its cut-out position, the insulator 62' actuates the set of switch springs S into its open position, for a purpose more fully explained hereinafter. Finally, the switch 21 comprises a stop arrangement, not shown, for preventing rotation thereof in the clockwise direction beyond its cut-out position.

Further, the circuit network comprises a gaseous discharge tube 74 that is preferably of the thyratron 884 type, including an anode 75, a control grid 76 and a cathode 77, as well as a cathode heater 78. Also the network includes a transformer 79 provided with a primary winding 80 connected between the neutral line 73 and the conductor 67 as well as two coupled secondary windings 81 and 82. One terminal of the secondary winding 81 is connected to the neutral line 73; and the other terminal of the secondary winding 81 is connected to one terminal of a selenium rectifier 83; and the other terminal of the selenium rectifier 83 is connected to the conductor 69; and a filtering capacitor C3 is arranged in bridging relation with respect to the neutral line 73 and the conductor 69. The arrangement of the rectifier 83 is such as to provide a considerable negative voltage, with respect to ground potential, upon the conductor 69, for a purpose more fully explained hereinafter. The terminals of the secondary winding 82 are directly bridged across the terminals of the cathode heater 78, for the purpose of rendering the cathode 77 electron-emissive.

Also, the circuit network comprises a selenium rectifier 84, one terminal of which is connected to the conductor 67, and the other terminal of which is connected commonly to one terminal of a resistor R1 and to one terminal of a filtering capacitor C2. The other terminal of the resistor R1 is connected commonly to a conductor 85 and to one terminal of a charging capacitor C1. The other terminals of the filtering capacitor C2 and the charging capacitor C1 are commonly connected to the neutral line 73. The conductor 85 and the neutral line 73 thus comprise a pair of feed conductors across which the capacitor C1 is charged in series with the resistor R1 from the rectifier 84, as explained more fully hereinafter. Further, the circuit network comprises a relay 86 of the marginal type provided with a winding 87 directly connected between the neutral line 73 and the conductor 85. Also the relay 86 includes four contact bridging members 88, 89, 90 and 91 respectively controlling associated pairs of contacts. One of the contacts of the pair controlled by the bridging member 88 terminates the outside line 71; and the other contact of this pair terminates one terminal of the heating unit 25. One of the contacts of the pair controlled by the bridging member 89 terminates the outside line 72; and the other contact of this pair terminates the other terminal of the heating unit 25. One of the contacts of the pair controlled by the bridging member 90 terminates one terminal of the secondary winding 82; and the other contact of this pair terminates one spring of the set of switch springs S; and the other spring of the set mentioned terminates one terminal of the biasing resistor 48. One of the contacts of the pair controlled by the bridging member 91 terminates the other terminal of the secondary winding 82; and the other contact of this pair terminates the other terminal of the biasing resistor 48. The anode 75 is connected via an associated resistor R6 to the conductor 85; the cathode 77 is connected directly to the neutral line 73; and the control grid 76 is connected to the other terminal of the resistor R5. Accordingly, in the arrangement the resistor R6 constitutes a plate current limiting resistor; the resistor R5 constitutes a grid current limiting resistor; and the winding 87 of the relay 86 and the anode-cathode circuit of the tube 74 are connected in parallel relation across the feed conductors 85 and 73. Moreover, the resistor R1 and the charging capacitor C1 comprise a R–C network; and the rectifier 84 is arranged to provide a considerable positive voltage, with respect to ground potential, upon the feed conductor 85.

In the circuit network, the characteristic values of certain of the elements may be as follows:

| | | |
|---|---|---|
| R1 | ohms | 3,000 |
| R2 | do | 40,000 |
| R3 | do | 3,000 |
| R4 | do | 2,500 |
| R5 | do | 20,000 |
| R6 | do | 82 |
| C1 | microfarads | 0.025 |
| C2 | do | 20 |
| C3 | do | 20 |

The pickup voltage of the marginal relay 86 may be 90 volts; and the dropout voltage thereof may be 80 volts.

Considering now the operation of the circuit network, when the control switch 21 occupies its normal off position, the wiper 61 disengages the cooperating conducting segment 65 deenergizing the primary winding 80 of the transformer 79 and opening the power circuit to the rectifier 84; whereby there are no operating potentials for the tube 74 and the relay 86 so that the tube 74 is extinguished and the relay 86 is restored. The restored relay 86 interrupts, at the bridging members 88 and 89, the power supply circuit for the heating unit 25; and interrupts, at the bridging members 90 and 91, the supply circuit for the biasing resistor 48.

Now assuming that the cook wishes to carry out a warm cooking operation upon the hotplate 16 and that the heating element 25 thereof is cool, the cook places the cooking vessel and its contents in its supported position upon the top surface of the heating element 25; whereby the bottom wall of the cooking vessel engages the sensing button 45 and moves the sensing unit 27 into its depressed position so that the sensing button 45 is in good thermal contact with the bottom of the cooking vessel. At this time, the thermistor 47 is cool so that it has the exceedingly high resistance previously noted. Finally, the cook rotates the manual dial 50 in the clockwise direction from its off position into its warm position; whereby the wiper 61 engages the cooperating conducting segment 65 completing a circuit for energizing the primary winding 80 of the transformer 79. The secondary winding 82 produces an A. C. voltage of about 6 volts effecting heating of the cathode heater 78; whereby the cathode 77 is rendered electron-emissive. Also the rectifier 83 is rendered operative by the secondary winding 81; and a potentiometer circuit is completed that extends from the negative biasing conductor 69 to the neutral line 73; which circuit includes the wiper 63, a major portion of the resistor R2, the conductor 70, the resistors R3 and R4, the thermistor 47, the conductor 68 and the wiper 62 and the engaged cooperating conducting segment 66. Also the rectifier 84 is rendered operative so that a positive voltage is applied to the conductor 85, and the capacitor C1 is charged through the resistor R1. The charge-time of the R–C circuit may be of the order of 0.00075 second; whereby the positive voltage of about 130 volts D. C. is quickly applied to the conductor 85 effecting energization of the winding 87 of the relay 86 causing the relay to operate. Upon operating, the relay 86, at the bridging members 88 and 89, effects energization of the heating element 25; and, at the bridging members 90 and 91, effects energization of the biasing resistor 48. At this time, a negative voltage of about 25 volts D. C. appears upon the negative biasing conductor 69; whereby a large negative bias is applied to the control grid 76 by virtue of the circumstance that the resistance of the thermistor 47 is exceedingly high at this time; whereby the tube 74 is driven to cut-off. Accordingly, at this time, the heating element 25 is energized effecting heating of the hotplate 16 and the consequent heating of the supported vessel and its contents; and also the biasing resistor 48 is heated effecting biasing heating of the sensing button 45.

As the temperature of the heating element 25 rises, the temperature of the cooking vessel and its contents rise; whereby the sensing button 45 is heated through the bottom wall of the cooking vessel to raise the temperature thereof. Hence, the temperature of the sensing button 45 rises both by virtue of the heat conducted thereto through the bottom wall of the supported vessel and by virtue of the heating of the biasing resistor 48; whereby the temperature of the thermistor 47 rises causing the resistance thereof to be correspondingly reduced, due to the high negative temperature coefficient of resistance thereof, as previously noted. At this point, it is pointed out that the sensing button 45 is shielded from direct radiation of heat from the heating element 25 by virtue of the arrangement of the heat shields 29 and 42, as shown in Fig. 2; and moreover, there is no substantial conduction of heat to the sensing button 45 through the mounting arrangement since the base 32 is formed of thermally insulating material, as previously noted, and the sensing unit, as a whole, is arranged in spaced relation with respect to the surrounding heat shield 29. Accordingly, the sensing button 45 senses the temperature of the bottom wall of the cooking vessel and its contents, deriving a major portion of its heat therefrom, and deriving a minor portion of its heat from the biasing resistor 48, for a purpose more fully explained hereinafter; whereby the temperature of the thermistor 47 bears a substantially linear relationship with respect to the temperature of the bottom wall of the cooking vessel.

As the temperature of the thermistor 47 is thus increased, the resistance thereof sharply decreases so that the ratio between the composite resistance of the resistor R2 and the small portion of the resistor R3 with respect to the composite resistance of the major portion of the resistor R3, the resistor R4 and the thermistor 47 is increased correspondingly reducing the negative bias applied to the control grid 76. Ultimately the temperature of the sensing button 45 is increased, as the cooking vessel and its contents are heated, to a point where the resistance of the thermistor 47 is reduced so that the negative bias applied to the control grid 76 is below the cut-off of the tube 74; whereby the tube 74 is rendered conductive. When the tube 74 is thus fired, the charge upon the capacitor C1 is quickly discharged through the resistor R6 included in the anode-cathode circuit of the tube 74; whereby the positive voltage applied to the anode 75 is below the de-ionizing or arc sustaining potential of the tube 74; whereby the tube 74 is extinguished. When the tube 74 is thus extinguished charging of the capacitor C1 through the resistor R1 takes place, thereby increasing the positive potential applied to the conductor 85 and consequently to the anode 75; whereby the tube 74 is rendered conductive in order again to discharge the capacitor C1. The R–C circuit, including the resistor R1 and capacitor C1, together with the tube 74, comprise a relaxation oscillator or saw-tooth voltage wave generator having a set frequency of about 13,000 cycles per second, employing the circuit constants, previously noted.

When the oscillator is thus in operation, the average positive D. C. voltage upon the conductor 85 is considerably reduced to a value of about 50 volts that is well below the drop-out voltage of the marginal relay 86; whereby the relay 86 restores. Upon restoring, the relay 86 interrupts, at the bridging members 88 and 89, the circuit for energizing the heating element 25; and interrupts, at the bridging members 90 and 91, the circuit for energizing the biasing resistor 48.

As time proceeds, the temperature of the heating element 25 subsides so that the temperature of the cooking vessel and its contents subside bringing about a reduction in the temperature of the sensing button 45, and a consequent decrease in the temperature of the thermistor 47, so that the resistance thereof is again automatically increased resulting in an increase in the negative bias applied to the control grid 76; whereby the tube 74 is ultimately again driven to cut-off. When operation of the oscillator is thus arrested, the positive voltage on the conductor 85 is again increased to about 130 volts D. C. that is well above the pick-up voltage of the marginal relay 86; whereby the releay 86 is re-operated again completing the circuits for energizing the heating element 25 and the biasing resistor 48.

As time proceeds, the heating element 25 again raises the temperature of the cooking vessel and its contents; whereby the temperature of the sensing button 45 is again elevated, so that the thermistor 47 again reduces the negative bias applied to the control grid 76 in order that the tube 74 is again rendered conductive. The oscillator again brings about the restoration of the marginal relay 86 and the consequent opening of the circuits for energizing the heating element 25 and the biasing resistor 48.

In view of the foregoing, it will be understood that when the control switch 21 is operated from its off position into its warm position, as described above, the relay 86 is first operated and operation of the oscillator is first arrested; whereby the heating element 25 is quickly heated to effect corresponding heating of the cooking vessel and its contents up to the desired cooking temperature. At this time, operation of the oscillator is initiated so that the marginal relay 86 is restored in order to bring about deenergization of the heating element 25 and the consequent cooling of the cooking vessel and its contents. Thereafter, operation of the oscillator and the marginal relay 86 are effected alternately to bring about modulation of the temperature of the heating element 25, so as to maintain the temperature of the cooking vessel and its contents substantially at the previously set cooking temperature established by the manual dial 50 in its warm position.

The carrying out of boil and fry cooking operations upon the electric range 10 are substantially identical to that described above in conjunction with the warm cooking operation, except that the manual dial 50 is rotated further in the clockwise direction into the corresponding boil and fry ranges thereof. More particularly, as the manual dial 50 is rotated in the clockwise direction in its warm, boil and fry ranges, the resistor R2 is progressively cut-out of the potentiometer circuit and the resistor R3 is progressively cut into the potentiometer circuit between the conductor 70 and the resistor R4; whereby the composite effect of the adjustments mentioned is substantially to reduce the resistance between the negative biasing conductor 69 and the control grid 76, so as to set progressively initially increased negative biases upon the control grid 76; whereby the temperature of the thermistor 47 must be increased to progressively higher temperatures in order appropriately to reduce the resistance thereof for the purpose of reducing the negative bias applied to the control grid 76 so as to render conductive the tube 74. For example, when the manual dial 50 occupies the high subsection of its fry range, the resistor R2 is completely cut-out of the potentiometer circuit and the resistor R3 is completely cut into the potentiometer circuit with respect to the wiper 64 so that only the resistor R3 is included between the negative biasing conductor 69 and the control grid 76; whereby a very high negative bias is applied to the control grid 76 so that the thermistor 47 must be heated to a very high temperature, corresponding to a cooking temperature of the cooking vessel and its contents at the extreme upper end of the fry range, before the resistance of the thermistor 47 is reduced sufficiently to reduce the negative bias applied to the control grid 76 to effect firing of the tube 74. Accordingly, it will be understood that the adjustment of the manual dial 50 in its variable on position, including the warm, boil and fry ranges thereof, selectively sets the cooking temperature of the cooking vessel and its contents that is to be maintained by the circuit network.

Finally, should the cook wish to use the hotplate 16 in a cooking operation without temperature control, the manual dial 50 is rotated in the clockwise direction from its off position through its warm, boil and fry positions into its cut-out position; whereby the wiper 62 disengages the associated conducting segment 66 effecting the removal of ground potential from the potentiometer circuit; whereby the full negative potential of the negative biasing conductor 69 is applied to the control grid 76 retaining the tube 74 driven to cut-off, regardless of the temperature of the thermistor 47 and its consequent resistance; and the set of switch springs S is operated into its open position to deenergize the biasing resistor 48. Thus, in the cut-out position of the manual dial 50, the heating unit 25 is constantly heated across the outside lines 71 and 72 without reference to the temperature thereof.

When the control switch 21 occupies any one of its warm, boil, fry or cut-out position, described above, the corresponding cooking operation may be terminated merely be returning the manual dial 50 in the counter-clockwise direction back into its off position so that the wiper 67 disengages the cooperating conducting segment 65 bringing about the deenergization of the primary winding 80 of the transformer 79 and interrupting the supply circuit to the rectifier 84; whereby the relay 86, if operated, restores and the tube 74, if firing, is extinguished, so that the circuit network is returned to its normal condition. Of course, the restoration of the relay 86 brings about the deenergization of the heating element 25 and the biasing resistor 48, in the manner previously explained.

Recapitulating, it will be understood that the tube 74 also constitutes a cycle switch operative cyclically to connect and to disconnect the plate current limiting or load resistor R6 across the feed conductors 85 and 73, so as to reduce the normal voltage therebetween sufficiently to bring about the restoration of the marginal relay 86, in the manner previously explained. Of course, when operation of this cyclic switch is arrested, the load resitor R6 is disconnected from across the feed conductors 85 and 73; whereby the voltage therebetween again rises sufficiently to bring about reoperation of the marginal relay 86.

In the circuit network, it will be understood that the frequency of the relaxation oscillator may be readily established by appropriately varying the resistance of the resistor R1 and the capacitance of the capacitor C1; however, as a practical matter, the frequency of the oscillator is not critical as operation of the oscillator over a wide range of frequencies will effect the desired reduction of the voltage between the feed conductors 85 and 73 so as to bring about the restoration of the marginal relay 86, in the manner previously described.

In the foregoing description of the circuit network, when the control switch 21 occupies its warm, boil or fry position, it was noted that the biasing resistor 48 was energized and deenergized simultaneously with the heating element 25; which arrangement of the biasing resistor 48, although not essential to operation, is highly advantageous in view of the fact that it prevents overshoot and undershoot of the temperature of the bottom wall of the supported cooking vessel with respect to the cooking temperature set by the operated position of the manual dial 50 in the operation of the circuit network, particularly with reference to the first cycle of the relay 86. In other words, there is a tendency for the temperature of the initially cold sensing button 45 to lag behind the temperature of the bottom wall of the cooking vessel in the first cycle of the circuit network; which tendency is overcome by the biasing heat that is added to the sensing button 45 by virtue of the energization of the biasing heater 48. Thereafter, the temperatures of the bottom wall of the cooking vessel and the sensing button 45 substantially equalize and change substantially simultaneously; whereby the temperature of the sensing button 45 is closely related to that of the bottom wall of the cooking vessel and its contents rendering the control by the sensing button 45 quite accurate.

In view of the foregoing description of the mode of operation of the circuit network, it will be understood that the thermal controls that are derived primarily from the cooking vessel supported by the hotplate 16 by the thermistor 47 are translated into appropriate and corresponding electrical influences applied to the potentiometer circuit. Now the initial setting of the potentiometer circuit is established fundamentally by the adjustment of the resistor R2 under the control of the adjusted position of the manual dial 50, thereby relating the adjusted position of the manual dial 50 to the desired temperature of the cooking vessel supported by the hotplate 16. In turn, the potentiometer controls the oscillator, that, in turn, controls the marginal relay 86 and the consequent heating of the heating element 25. Moreover, the temperature of the thermistor 47, as established primarily by the temperature of the bottom wall of the cooking vessel and its contents, controls the potentiometer in view of the initial setting thereof under the control of the control switch 21. Accordingly, the heating element 25 is energized cyclically effecting modulation of the heating of the hotplate 16 and thereby maintaining the desired cooking temperature of the supported cooking vessel and its contents.

Accordingly, it is apparent that there has been provided in heating apparatus of the hotplate type, an improved circuit network for selectively establishing within a relatively wide temperature range the desired cooking temperature of a cooking vessel supported by the hotplate and for selectively controlling the electric power supplied to the hotplate in accordance with the desired cooking temperature thus established, so as to maintain this desired cooking temperature of the cooking vessel during the cooking operation.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In electric heating apparatus including an electric heating unit adapted to support a vessel to be heated, a source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having off and on positions, an oscillator, means responsive to operation of said control switch into its on position for preparing said oscillator, means controlled by the resistance of said sensing resistor for selectively operating said prepared oscillator, said last-mentioned means arresting operation of said oscillator when said sensing resistor has a resistance corresponding to a relatively low temperature of the supported vessel and initiating operation of said oscillator when said sensing resistor has a resistance corresponding to a relatively high temperature of the supported vessel, and means controlled operation of said oscillator for selectively operating said power switch between its open and closed positions, said last-mentioned means respectively operating said power switch into its open and closed positions when operation of said oscillator is respectively initiated and arrested.

2. The electric heating apparatus combination set forth in claim 1, wherein said sensing resistor consists essentially of a thermistor having a relatively high resistance when the temperature of the supported vessel is relatively low and having a relatively low resistance when the temperature of the supported vessel is relatively high.

3. In electric heating apparatus including an electric heating unit adapted to support a vessel to be heated, a source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having an off position and a variable on position, a control resistor, an oscillator, means responsive to operation of said control switch into its on position for preparing said oscillator, said control switch in its variable on position variably setting the resistance of said control resistor, means controlled jointly by the resistance of said sensing resistor and by the resistance of said control resistor for selectively operating said prepared oscillator, said last-mentioned means arresting operation of said oscillator when said sensing resistor has a resistance corresponding to a relatively low temperature of the supported vessel and initiating operation of said oscillator when said sensing resistor has a resistance corresponding to a relatively high temperature of the supported vessel and means controlled by operation of said oscillator for selectively operating said power switch between its open and closed positions, said last-mentioned means respectively operating said power switch into its open and closed positions when operation of said oscillator is respectively initiated and arrested.

4. The electric heating apparatus combination set forth in claim 1, wherein said oscillator is of the relaxation type including a resistor and a capacitor connected in series relation in a charging circuit and a gaseous tube bridging said capacitor.

5. In electric heating apparatus including an electric heating unit adapted to support a vessel to be heated, a source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having off and on positions, a pair of feed conductors, means responsive to operation of said control switch into its on position for supplying potential between said pair of feed conductors, a marginal relay provided with a winding connected between said feed conductors, an oscillator connected between said feed conductors, a biasing circuit including said sensing resistor for selectively controlling operation of said oscillator, said biasing circuit arresting operation of said oscillator when said sensing resistor has a resistance corresponding to a relatively low temperature of the supported vessel and initiating operation of said oscillator when said sensing resistor has a resistance corresponding to a relatively high temperature of the supported vessel, the potential between said feed conductors being above the pick-up value of said relay when operation of said oscillator is arrested and below the drop-out value of said relay when operation of said oscillator is initiated, and means controlled by operation and restoration of said relay for operating said power switch into its respective closed and open positions.

6. In electric heating apparatus including an electric heating unit adapted to support a vessel to be heated, a source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having off and on positions, a pair of feed conductors, means responsive to operation of said control switch into its on position for supplying potential between said pair of feed conductors, a marginal relay provided with a winding connected between said feed conductors, a load resistor, a cycle switch operative to connect and to disconnect said load resistor cyclically between said feed conductors, means including said sensing resistor for selectively controlling operation of said cycle switch, said last-mentioned means arresting operation of said cycle switch when said sensing resistor has a resistance corresponding to a relatively low temperature of the supported vessel and initiating operation of said cycle switch when said sensing resistor has a resistance corresponding to a relatively high temperature of the supported vessel, said cycle switch disconnecting said load resistor between said feed conductors when operation thereof is arrested, the potential between said feed conductors rising above the pick-up value of said relay when said load resistor is normally disconnected therebetween and falling below the drop-out value of said relay when said load resistor is cyclically connected and disconnected therebetween, and means controlled by opertion and restoration of said relay for operating said power switch into its respective closed and open positions.

7. In electric heating apparatus including an electric heating unit adapted to support a vessel to be heated, an alternating current source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having off and on positions, a rectifier, means responsive to operation of said control switch into its on position for supplying power from said source to said rectifier, a resistor-capacitor network supplied with potential from said rectifier, a marginal relay provided with a winding connected to said network, an oscillator connected to said network, a control circuit including said sensing resistor for selectively governing operation of said oscillator, said control circuit arresting operation of said oscillator when said sensing resistor has a resistance corresponding to a relatively low temperature of the supported vessel and initiating operation of said oscillator when said sensing resistor has a resistance corresponding to a relatively high temperature of the supported vessel, the potential of said network being above the pick-up value of said relay when operation of said oscillator is arrested and below the drop-out value of said relay when operation of said oscillator is initiated, and means controlled by operation and restoration of said relay for operating said power switch into its respective closed and open positions.

8. In electric heating apparatus including an electric heating unit adapted to support a vessel to be heated, an alternating current source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having off and on positions, a rectifier, means responsive to operation of said control switch into its on position for supplying power from said source to said rectifier, a resistor-capacitor network supplied with potential from said rectifier, a marginal relay provided with a winding connected to said network, a gaseous tube provided with an anode and a cathode and a control grid, means connecting said anode and said cathode to said network to provide a relaxation oscillator, a control circuit including said sensing resistor for applying a selective bias to said control grid with respect to said cathode, said control circuit applying a bias greater than cut-off to said control grid when said sensing resistor has a resistance corresponding to a relatively low temperature of the supported vessel and applying a bias less than cut-off to said control grid when said sensing resistor has a resistance corresponding to a relatively high temperature of the supported vessel, operation of said oscillator being arrested when a bias greater than cut-off is applied to said control grid and being initiated when a bias less than cut-off is applied to said control grid, the potential of said network being above the pick-up value of said relay when operation of said oscillator is arrested and below the drop-out value of said relay when operation of said oscillator is initiated, and means controlled by operation and restoration of said relay for operating said power switch into its respective closed and open positions.

9. In electric heating apparatus including an electric heating unit adapted to support a vessel to be heated, an alternating current source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having an off position and a variable on position, a rectifier, means responsive to operation of said control switch into its on position for supplying power from said source to said rectifier, a resistor-capacitor network supplied with potential from said rectifier, a marginal relay provided with a winding connected to said network, a control resistor, said control switch in its variable on position variably setting the resistance of said control resistor and consequently a given cooking temperature of the supported vessel, a gaseous tube provided with an anode and a cathode and a control grid, means connecting said anode and said cathode to said network to provide a relaxation oscillator, a control circuit including both said sensing resistor and said control resistor for applying a selective bias to said control grid with respect to said cathode, said control circuit applying a bias greater than cut-off to said control grid when said sensing resistor has a resistance corresponding to a temperature below said given cooking temperature of the supported vessel and applying a bias less than cut-off to said control grid when said sensing resistor has a resistance corresponding to a temperature above said given cooking temperature of the supported vessel, operation of said oscillator being arrested when a bias greater than cut-off is applied to said control grid and being initiated when a bias less than cut-off is applied to said control grid, the potential of said network being above the pick-up value of said relay when operation of said oscillator is arrested and below the drop-out value of said relay when operation of said oscillator is initiated, and means controlled by operation and restoration of said relay for operating said power switch into its respective closed and open positions.

10. In electric heating apparatus including an electric heating unit adapted to support a vessel to be heated, an alternating current source of electric power, and a power switch operative between an open position disconnecting said heating unit from said source and a closed position connecting said heating unit to said source; the combination comprising a temperature sensing resistor arranged in heat exchange relation with a vessel supported by said heating unit and having a high temperature coefficient of resistance so that the resistance of said sensing resistor is selectively variable in accordance with the temperature of the supported vessel, a control switch having an off position and an on position and a cut-out position, a rectifier, means responsive to operation of said control switch into its on position for supplying power from said source to said rectifier, a resistor-capacitor network supplied with potential from said rectifier, a marginal relay provided with a winding connected to said network, a gaseous tube provided with an anode and a cathode and a control grid, means connecting said anode and said cathode to said network to provide a relaxation oscillator, a control circuit including said sensing resistor for applying a selective bias to said control grid with respect to said cathode, said control circuit applying a bias greater than cut-off to said control grid when said sensing resistor has a resistance corresponding to a relatively low temperature of the supported vessel and applying a bias less than cut-off to said control grid when said sensing resistor has a resistance corresponding to a relatively high temperature of the supported vessel, means responsive to operation of said control switch into its cut-out position for supplying power from said source to said rectifier and for governing said control circuit to apply a bias greater than cut-off to said control grid, operation of said oscillator being arrested when a bias greater than cut-off is applied to said control grid and being initiated when a bias less than cut-off is applied to said control grid, the potential of said network being above the pick-up value of said relay when operation of said oscillator is arrested and below the drop-out value of said relay when operation of said oscillator is initiated, and means controlled by operation and restoration of said relay for operating said power switch into its respective closed and open positions.

References Cited in the file of this patent
UNITED STATES PATENTS

| Number | Name | Date |
| --- | --- | --- |
| 2,093,745 | Westell | Sept. 21, 1937 |
| 2,189,462 | Donle | Feb. 6, 1940 |
| 2,215,404 | Myers | Sept. 17, 1940 |
| 2,218,502 | Breitenstein | Oct. 22, 1940 |
| 2,616,020 | Fay et al. | Oct. 28, 1952 |
| 2,632,086 | Hagen | Mar. 17, 1953 |
| 2,686,250 | Schroeder | Aug. 10, 1954 |
| 2,713,130 | Weiller | July 12, 1955 |